United States Patent Office 2,710,256
Patented June 7, 1955

2,710,256

PHOTOGRAPHIC PRINT-OUT PROCESS

Leopold Eckler, Summit, N. J., and Fritz W. H. Mueller, Binghamton, N. Y., assignors to General Aniline & Film Corporation, New York, N. Y., a corporation of Delaware No Drawing. Application April 25, 1951, Serial No. 222,942

6 Claims. (Cl. 95—88)

This invention relates to a process of preparing diazotype photographic prints from an intermediate positive printing material.

It is well known that mechanical drawing tracings can be reproduced by exposing a sensitized diazotype photographic printing paper to light beneath the tracing. During the exposure, the light sensitive diazo compound is destroyed at the exposed portions of the printing paper while that in the unexposed portions is unaffected. The printing paper is then subjected to ammonia vapor, which causes the unaffected diazo component to couple with the azo component converting the unexposed portions to a dye image of the drawing, the color of which depends upon the type of diazo and coupling compounds employed in coating the printing paper.

As the art is now practiced, there is no practical time-saving method of producing diazotype prints from either black and white or color negatives. Although such prints can be obtained by converting a black and white or color negative into a positive or diapositive transparency, by photographic means in the usual manner, such procedure is quite involved and time consuming. For example, to convert a black and white negative into a positive transparency, a photographic film having a transparent base is exposed in contact with the negative or by projection printing, whereby the image of the negative is formed on the film. The proper exposure, both in contact and projection printing, is determined by means of test strips. At times it is difficult to determine the best exposure from test strips, since so little of the image is included that it is difficult to decide what exposure produces the desired result. This step alone is time consuming and after the proper degree of exposure has been established, the exposure is made, the film developed in darkness for the usual time, short-stopped, fixed, and washed for about 30 minutes, and then dried. These processing steps, to arrive at a finished positive, normally require from about 1½ to 2 hours.

We have found that diazotype prints can be obtained from black and white or color negatives, without resorting to the foregoing procedure, by exposing in contact a print-out film with the negative to direct sunlight or other actinic printing light source, and preferably to the light source of a diazo-type printing apparatus in the usual manner. The intermediate positive printing-out film record thus obtained is utilized in either of two ways in producing diazotype prints as will be described hereinafter.

It is an object of the present invention to provide a simple and expeditious process of producing diazotype prints from black and white and color negatives by means of an intermediate positive printing material.

Further objects and advantages of the invention will be apparent to one skilled in the art from the following description.

These objects are accomplished, according to our invention by first exposing a black and white or color negative in contact with a photographic emulsion of the type known as print-out emulsion upon a transparent base such as cellulose acetate, cellulose nitroacetate, cellophane (regenerated cellulose), and the like, in the usual manner to obtain a transparent positive. The exposed print-out film or transparent positive thus obtained is utilized in either of two processes. In the first of these processes, which for sake of convenience will be called the dry process, a light sensiitve diazotype material coated upon a transparent base, such as cellulose acetate, cellulose nitroacetate, superpolyamide, and the like, is exposed to ultraviolet light beneath the transparent positive in a diazotype printing apparatus in the usual manner to provide a duplicate positive master which is used in making any number of prints on diazotype printing paper. The original print-out master or positive becomes darkened during exposure in the making of the duplicate positive master to such an extent that it cannot be used in making aditional duplicate positive masters.

In the second of these processes, which for sake of convenience will be called the wet process, the exposed transparent positive is stabilized, i. e., precluded from undergoing any change in density upon subsequent exposure to light by immersing it for about 30 seconds in an aqueous solution (½ to 2½ grams per liter) of an organic compound having an imino, mercapto, selenomercapto, or other groups capable of forming silver salts of low solubility, such as, for example, benzotriazole, methyl benzotriazole, ethyl thiotriazole, thiolactic acid, pyrazole, pyrazolone, thiopyrazolone, purine, 8-thiopurine, 2,6-dimercapto-3,5-diphenyl thiopyrone, allyl amino thiodiazole sulfohydrate, and the like.

Such aqueous solution may also contain a low boiling solvent, i. e., boiling not higher than 100° C., such as methyl alcohol, ethyl alcohol, propyl alcohol, etc., and also preferably containing a small quantity of a wetting agent, such as sulfonated oleic acid, sodium salt of tetrahydronaphthalene sulfonic acid, oleic acid ester of hydroxyethane sulfonic acid, and the like. After drying for 10 to 20 minutes, the stabilized positive is then placed on a diazotype sensitized material and the latter printed by exposure and development in the usual manner. The immersion of the positive in a stabilizing bath, stabilizes the positive to such an extent that it does not undergo any appreciable change in density or contrast when subsequently exposed in contact with a diazotype printing paper in a diazotype printing apparatus.

The print-out emulsions, used in obtaining the intermediate positive printing material, are characterized by the fact that a visible positive image is produced in them directly by the action of light, whereas developing emulsions or developing-out emulsions must be subjected to the action of a developer in order to produce a visible image. Print-out emulsions are usually prepared by the precipitation in a colloidal medium, such as gelatin, water soluble cellulose derivatives, e. g., hydroxy ethyl cellulose, methyl cellulose, carboxy cellulose, low acetyl value cellulose acetate, and the like, of a halide of silver by the interaction of a solution of a soluble halide with a solution of a soluble compound of silver. In the case of print-out emulsions of silver chloride, the silver chloride is usually precipitated in the colloidal medium in such a way that the final product contains an excess of soluble silver compound, for instance, silver nitrate, the silver salt of an organic acid, such as silver citrate, silver tartrate, or silver thiosalicylate, together with some of the free organic acid of such salts. The emulsions are not washed after precipitation of the silver halide. Print-out emulsions of silver bromide are similarly prepared. For the purpose of the present invention, any print-out emulsion upon a clear and transparent base, having the usual non-curling layer, may be employed regardless of the nature of the silver halide and dispersing agents therefor, so long as a visible positive image is produced by exposing it directly to light in contact with a negative material.

The diazotype sensitized materials coated upon a transparent base and utilized in the preparation of a duplicate positive for the dry process, or coated upon a paper or cellulosic base as a printing medium, are those classes of sensitized materials prepared in accordance with the procedures given in United States Patents 1,444,469, 1,628,279, 1,803,906, 1,816,989, and 2,158,836. These sensitized materials consist for the most part of two dye components, one of which is a light sensitive body called the diazo component and the other, which is called a coupling component, is a compound capable of reacting, under suitable conditions, with the diazo component to form a dye. The diazo component of such a light sensitive layer is most sensitive to light emission between the 360 Å. and 4200 Å. lines. Such rays effectively decompose the diazo component, so that it can no longer combine with the coupling component to form a dye. Thus, when a diazotype layer is exposed under the intermediate positive printing material to a source of light furnishing rays in the region of 3600 Å. to 4200 Å. lines, the diazo component in those areas which are not protected by the dense areas of the intermediate positive printing material is decomposed. Upon subsequent development, a dye forms only in the areas which were protected from the light by the dense areas of the intermediate positive printing material. Those areas which were unprotected and hence, exposed to light, will be colorless and thus the image of the original will be reproduced in color on a colorless background. Since development of these diazotype light sensitive layers is effected by contacting the exposed reproduction with a gaseous developing medium, such as ammonia gas, no shrinking occurs and an exact dimensional replica is obtained ready for use and free from added reagents.

In order to more clearly explain this invention, the following example is given. It is, of course, to be understood that the invention is not limited to this precise example which is merely illustrative.

*Example*

The emulsion side of a 5" x 7" black and white negative of average density and contrast was exposed in contact with the emulsion side of a print-out film to ultraviolet light for a few seconds. The exposed print-out film was stabilized by immersion for about 30 seconds into an aqueous solution of 2½% benzotriazole to which was added a small quantity of sulfonated oleic acid. After drying for about 6 to 8 minutes, a diazotype printing paper was coated with the following light sensitive composition:

| | |
|---|---|
| Water cc | 80.0 |
| Glycerin cc | 5.0 |
| Citric acid grams | 10.0 |
| Zinc chloride do | 5.0 |
| Thiourea do | 5.0 |
| m-Hydroxy phenylurea do | 5.0 |
| 2,3-dihydroxy naphthalene do | 0.05 |
| p-Diazo diphenylamine do | 5.0 |

The coated diazotype printing paper was exposed to ultraviolet light under the dried print-out film, and the exposed paper developed in the usual manner by exposure to a mixture of water vapor and ammonia gas. The full density areas of the print-out film were reproduced in a green tone and the half-tone or low density areas were reproduced in a purple tone.

The print-out film employed was essentially a heavy cellulose acetate base with the usual clear non-curl coating and the emulsion layer was a typical printing-out type prepared from a liquid gelatino silver halide emulsion in which the gelatin and silver halide concentrations were approximately 10% and the silver halide was 100% silver chloride.

Obviously, various other modifications will occur to those skilled in the art, which, however, do not depart from the spirit and nature of this invention, and we do not intend to be limited in the patent granted except as required by the appended claims.

This application is a continuation-in-part of our application Serial No. 701,052, filed on October 3, 1946, now abandoned.

We claim:

1. In the process of contact printing a negative transparency onto a print-out film comprising a transparent support carrying a gelatino silver chloride, print-out emulsion, in which process a visible positive silver image is produced directly by exposure to light without the use of a photographic developing solution, the improvement which comprises precluding the contact printed print-out film from darkening upon further exposure to light by treating it with a solution containing an organic compound having a silver salt forming group and capable of reacting with unexposed silver chloride to produce a substantially light insensitive silver salt more insoluble in water than silver chloride for a time sufficient to react with substantially all of the unexposed silver chloride, said organic compound being selected from the group consisting of benzotriazole, methyl benzotriazole, ethyl thiotriazole, thiolactic acid, pyrazole, pyrazolone, thiopyrazolone, purine, 8-thiopurine, 2,6-dimercapto-3,5-diphenyl thiopyrone, and allyl amino thiodiazole sulfohydrate, said solution containing neither a developing agent nor a silver halide solvent.

2. The process according to claim 1, wherein the organic compound containing a silver salt forming group is benzotriazole.

3. The process according to claim 1, wherein the organic compound containing a silver salt forming group is ethyl thiotriazole.

4. The process according to claim 1, wherein the organic compound containing a silver salt forming group is methyl benzotriazole.

5. The process according to claim 1, wherein the organic compound containing a silver salt forming group is 8-thiopurine.

6. The process according to claim 1, wherein the organic compound containing a silver salt forming group is allyl amino thiodiazole sulfohydrate.

References Cited in the file of this patent

UNITED STATES PATENTS

| | | |
|---|---|---|
| 1,356,236 | Sulzberger | Oct. 19, 1920 |
| 1,758,577 | Mathies | May 13, 1930 |
| 1,763,989 | Sheppard | June 17, 1930 |
| 2,066,099 | Dieterle | Dec. 29, 1936 |
| 2,083,675 | Ville | June 15, 1937 |
| 2,090,607 | Baldsiefen | Aug. 17, 1937 |
| 2,214,446 | Albers | Sept. 10, 1940 |
| 2,319,090 | Sheppard | May 11, 1943 |
| 2,353,754 | Peterson | July 18, 1944 |
| 2,453,346 | Russell | Nov. 9, 1948 |

FOREIGN PATENTS

| | | |
|---|---|---|
| 337,323 | Great Britain | Oct. 30, 1930 |
| 43,889 | France | June 18, 1934 |
| | (Addition to 633,638) | |

OTHER REFERENCES

Krafft: "Zeitschrift für Wissenschaftliche Photographie, Photophysik und Photochemie," Band 31, Heft 12, May 1933, pp. 329–364 (pp. 338, 339, 344–349 especially cited).

Mees: "The Theory of the Photographic Process." Macmillan, New York, 1942, pp. 90, 91, 459–461.

Clerc: "Photography, Theory and Practice," Pitmann, New York, 2nd Ed. 1937, pp. 270–272, 353, 354.